(12) United States Patent
Choi et al.

(10) Patent No.: US 6,284,184 B1
(45) Date of Patent: Sep. 4, 2001

(54) METHOD OF LASER MARKING ONE OR MORE COLORS ON PLASTIC SUBSTRATES

(75) Inventors: Jae Hong Choi, Carmel, IN (US); Ronald Dale Hernandez, Shreveport, LA (US)

(73) Assignee: Avaya Technology Corp, Basking Ridge, NJ (US)

( * ) Notice: Subject to any disclaimer, the term of this patent is extended or adjusted under 35 U.S.C. 154(b) by 0 days.

(21) Appl. No.: 09/384,866

(22) Filed: Aug. 27, 1999

(51) Int. Cl.$^7$ ..................................... B29C 45/16
(52) U.S. Cl. ..................... 264/400; 264/139; 264/241; 264/245; 264/328.18; 264/349
(58) Field of Search ..................... 264/139, 241, 264/245, 400, 328.17, 328.18, 349

(56) References Cited

U.S. PATENT DOCUMENTS

| | | |
|---|---|---|
| 3,716,612 * | 2/1973 | Schrenk et al. ............ 264/241 |
| 4,245,003 | 1/1981 | Oransky et al. . |
| 4,323,755 | 4/1982 | Nierenberg . |
| 4,514,456 | 4/1985 | Deal et al. . |
| 4,515,867 | 5/1985 | Bleacher et al. . |
| 4,542,691 | 9/1985 | Kokrhanek . |
| 4,588,674 | 5/1986 | Stewart et al. . |
| 4,639,745 | 1/1987 | Matsui et al. . |
| 4,680,002 | 7/1987 | Hehl . |
| 4,748,046 | 5/1988 | Kuboki et al. . |
| 4,769,257 | 9/1988 | Duley et al. . |
| 4,851,061 * | 7/1989 | Sorkoram ..................... 156/63 |
| 4,861,620 | 8/1989 | Azuma et al. . |
| 4,865,873 | 9/1989 | Cole, Jr. et al. . |
| 4,933,205 | 6/1990 | Duley et al. . |
| 4,939,012 | 7/1990 | Dust et al. . |
| 5,061,341 | 10/1991 | Kildal et al. . |
| 5,376,314 | 12/1994 | Share et al. . |
| 5,420,575 | 5/1995 | Cheraso et al. . |
| 5,478,426 | 12/1995 | Wiler et al. . |
| 5,489,639 | 2/1996 | Faber et al. . |
| 5,513,567 | 5/1996 | Froh et al. . |
| 5,576,144 | 11/1996 | Pearce et al. . |
| 5,653,167 | 8/1997 | De Volder . |
| 5,693,387 | 12/1997 | Rosenbaum et al . . |
| 5,705,254 | 1/1998 | Morinaga et al. . |
| 5,736,233 | 4/1998 | Fye . |
| 5,798,037 | 8/1998 | Peacock . |
| 5,830,529 | 11/1998 | Ross . |
| 5,900,050 | 5/1999 | Hayden et al. . |
| 5,904,886 | 5/1999 | Stecker . |
| 5,987,920 * | 11/1999 | Bosman et al. ..................... 65/23 |

* cited by examiner

Primary Examiner—Jan H. Silbaugh
Assistant Examiner—Stefan Staicovici
(74) Attorney, Agent, or Firm—Fay Sharpe Fagan Minnich & McKee, LLP

(57) ABSTRACT

A method for laser marking one or more colors on a plastic substrate is disclosed. A polymeric blend or mixture comprising two or more polymeric systems is utilized to produce a molded component. The various polymeric systems are heated to form a polymeric blend or mixture that is in a molten flowable state. The polymeric mixture is then shaped into the desired end product, preferably by injection molding. While molding, the polymeric mixture separates according to the different densities of the polymers; with the lightest density polymers migrating toward the inner surface of the mold and the heavier density polymers centralizing within the interior of the mold. The lightest density polymer forms the outer surface of the molded product, which may essentially constitute an outer layer coating disposed around the other polymeric systems. Upon removal of the cured layered product, the skin layer is then preferably ablated using a laser to expose the polymers of desired color beneath the outer layer. Other layers within the molded product may be ablated. Ablation may be performed to form a desired design in multiple colors. Other techniques for removing polymeric material in one or more layers are contemplated.

22 Claims, 4 Drawing Sheets

METHOD OF LASER MARKING ONE OR MORE COLORS ON PLASTIC SUBSTRATES

FIELD OF THE INVENTION

This invention relates to a novel method of laser marking a plastic substrate, and particularly, although not exclusively, to a method for producing a light colored design on a dark colored plastic substrate. The present invention is unique in that it provides a method of laser marking one or more colors on a plastic substrate, to produce an image or design that is aesthetically pleasing and durable. Another significant aspect of the present invention is that it eliminates the requirement of multiple molding or assembly operations otherwise necessary to form a layered polymeric substrate.

BACKGROUND OF THE INVENTION

One conventional method of manufacturing a multi-colored design on a plastic substrate is hot stamping, in which a roll leaf is stamped with heated metal dies onto a plastic face, thus engraving the desired marking or design into the plastic. Hot stamping to form a multi-colored image suffers from a significant disadvantage in that it is considerably expensive since it requires a costly metal or silicone rubber printing plate. Furthermore, such printing components are rather complex and tedious to operate and maintain. In addition, depending on the surface of the object to be stamped, it may be difficult to produce an image with a sharp profile or contrast.

Another common method of producing a multiple colored design on a plastic substrate is the pad printing technique. This method, as generally disclosed in U.S. Pat. No. 5,513,567, entails first applying a base coat material over a substrate surface, then printing a desired image from an ink that adheres to the base coat material, and finally applying an adhesive top coat material over the ink image. This method suffers from a disadvantage of being burdensome and costly in manufacturing since multiple ink applications are necessary. In addition, solvent used as a diluent is an environmental hazard. Furthermore, the topcoat and/or image layer(s) can wear off before the end of the useful life of the substrate.

Laser ablation for marking plastics is another conventional method of producing a multi-color design on a plastic substrate. Traditionally, a polymer of a desired undercoat color is injected into a mold and then allowed to cure to form a first layer. Then, a differently colored polymer is injected over the cured first layer to form a second layer, and that second layer is allowed to cure. The outermost second layer is then ablated to expose the first layer with the desired color. Alternatively, two polymeric layers may be separately formed and then welded together by an adhesive layer or cured together to form a multi-layered polymer substrate. The top layer or outer layer of the substrate is then laser ablated in order to expose the underlying colored layers in the shape of the desired pattern. This method suffers from a significant disadvantage in that multiple steps of welding or adhesive bonding two or more polymeric layers together are necessary. And, in the previously noted related version of this technique, multiple injection molding and multiple curing phases are required.

Multiple material molding (sometimes referred to as "multi-material molding") techniques produce components having graphics through the use of highly specialized molding machines that utilize multiple injection barrels. Multiple material molding requires one injection barrel (sometimes referred to as a screw assembly) for each material that is utilized. These barrels inject colored material into a mold, wherein the colored materials are directly formed into a component having a graphic and a background. Multiple material molding techniques require substantial investment in tooling costs, particularly since an injection barrel is required for each color that is to be utilized. The simplest arrangement for a component having a graphic requires the use of materials of two colors: a first color for the graphic and a second color for the background. Such an arrangement requires two injection barrels, one barrel for each color. For many applications, the requirement of multiple barrels results in prohibitively high tooling costs. In addition to cost considerations, the color appearance of multiple-color graphics produced by prior multi-material molding methods is often unsatisfactory.

"Paint-and-laser" techniques involve producing a transparent plastic substrate that is painted white or another light color to form a white translucent layer over the transparent substrate. The component produced thereby is then painted a relatively dark color, such as black, to form an opaque covering over the white translucent layer. The black covering is then lased away to expose a portion of the white translucent material. The exposed portion of translucent material forms the graphic. Paint-and-laser techniques are described, for example, in U.S. Pat. No. 5,432,684 to Fye et al. assigned to the same assignee as the present application.

Paint-and-laser techniques are typically utilized in the production of components having a single color graphic (for example, a white graphic and a black background), since the technique involves sequential painting of the component with one color followed by another color. However, if the graphic requires multiple colors, expensive and time-consuming paint masking operations must generally be incorporated into the technique.

There are additional disadvantages associated with these prior art techniques. Paint-and-laser multicolor techniques also have significant cost and/or quality limitations. The previously noted hot stamp technique has historically resulted in high numbers of unusable ("high scrap") products and often suffers from lifted edges and undesirable witness lines. Witness lines are readily apparent topographies that are not hidden by layers of paint. In a foil or heat transfer operation, the thickness of the heat transfer or printed block of ink underneath a dark background color will often be visible in the final product. The pad printing color technique previously mentioned also suffers from witness lines due to the required thickness of the ink. Witness lines can in some cases be masked, at least partially, by using carefully chosen patterns and multiple printings. However, pad printing, for example, generally suffers from the inability to produce different colors close to each other and results in an expensive product due to the number and complexity of processing steps and the typically high scrap rates.

Sublimation printing has also been used to produce multiple color graphics in certain products. In this technique, solid inks disposed on a carrier are brought into contact with an area on a substrate that is to be colored. Through the application of pressure and heat, dye or colorant in the ink is driven into the substrate. Under certain process conditions, the dyes change state from a solid to a gas (i.e., sublime), thereby facilitating penetration into the surface of the substrate. The sublimation process has been used to deposit dark graphics on opaque, light-colored computer keyboard key caps. Sublimation printing has also been used to form colored designs on white or light-colored plastics and synthetic fabrics. Sublimation dyes are available from a variety of suppliers as either screen printing inks or as inks pre-printed on a carrier in custom designs. However, sublimation printing suffers from a disadvantage in that it is more difficult, if not impossible, to obtain a light image on a dark background.

A common problem of all of the traditional methods is that forming specific hues and shades of a desired color in a multi-colored image is often very difficult. For example, when hot stamping, the desired color, through the process of heating and stamping, may lose its color, fade, or otherwise become discolored. It is also difficult to use any of the processes to form the desired shade or hue of a light colored image upon a dark background.

For at least the foregoing reasons, there is a need for a technique for producing a multi-colored image or marking on a plastic substrate that does not suffer from the disadvantages listed above.

SUMMARY OF THE INVENTION

The present invention, in a first aspect, provides a process for producing a polymeric component having an outer region of a first color and a design or indicia of a second color defined within that region. The process comprises blending a first colored polymeric system with a second differently colored polymeric system to form a polymeric blend. The polymeric systems are selected such that the densities of the two polymeric systems differ by at least 0.04 grams/cc. The process further comprises heating the polymeric blend to a liquid flowable state and introducing the blend to a mold while using an injection pressure of at least 8000 psi. The process additionally comprises steps of solidifying the polymeric blend in the mold to form the polymeric component and then removing portions of an outer layer of the polymeric system having the lighter density and constituting an outer layer of the component, thereby exposing the other polymeric component and producing the desired design or indicia.

In another aspect, the present invention provides a process for producing a design having a first color on a plastic substrate having a second color. The process comprises selecting the desired polymeric systems and colors, such that the densities of the systems differ by at least 0.02 grams/cc. The process further comprises the steps of combining the systems together to form a polymeric blend, placing the blend in a flowable state, providing a mold and introducing the polymeric blend into the mold under conditions causing the systems to at least partially separate from each other and form a layered array. The process also comprises the steps of removing the layered array from the mold and then removing a portion of an outer layer of the layered array to reveal a differently colored layer underneath.

In yet another aspect, the present invention provides a process for producing a molded polymeric component having a first outer layer of a first polymeric system surrounding a second polymeric system generally disposed within the interior of the polymeric component. The process comprises the steps of forming a mixture of a first polymeric system and a second polymeric system in which the density of the first system is greater than the density of the second system by at least 0.04 grams/cc. The process further comprises a step of molding the polymeric mixture at an injection pressure of at least 8,000 psi to form the molded polymeric component in which the polymeric systems are generally separated in layers within the component.

The present invention also provides the molded and marked polymeric products produced in accordance with these techniques.

Other objects and advantages of the present invention will become apparent upon reference to the accompanying detailed description when taken in conjunction with the following drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

The present invention will now be described more fully hereinafter. The present invention may be embodied in many different forms and should not be construed as limited to the embodiments set forth herein. The embodiments described herein are provided so that this disclosure will be thorough and complete, and will fully convey the invention to those skilled in the art.

According to a first preferred aspect of the present invention, a technique for marking a plastic substrate to form a colored image or design is provided. A first polymer or polymeric system is selected with a desired color for the image or design. The first polymer or polymeric system has a relatively high specific gravity. A second polymer or polymeric system is selected with a different color, that being the substrate or background color, with a relatively low specific gravity. Additional polymers may be added with different colors, depending on the desired image. The polymers are then mixed and heated in order to form a single liquid polymer blend or mixture. This polymer blend is then added to an injection molding machine, which injects the polymer blend into the cavity of a mold in the desired shape of the finished product. The multicomponent polymer blend may be injected into the mold through a single injection port.

Upon injection, the polymers separate, with the lower density polymer(s) transported or displaced toward the inner surface of the mold, and the heavier, higher density polymer(s) displaced toward the interior of the mold, generally within and surrounded by the lighter density polymeric system(s). Preferably, the mold is at a different temperature than the polymeric blend, and at a temperature that is lower than the glass transition temperature ($T_g$) of each of the polymers within the polymeric blend and most preferably also below the melting point of each of the polymers within the blend. Once the polymeric blend enters the mold cavity and the polymers separate into their respective phases, the lighter density polymer, when in contact with the lower temperature mold surface, solidifies, or substantially so, to form an outermost skin layer. The entire system is then allowed to cure, wherein the polymeric systems harden and form the desired plastic molded article.

Once cured, a method of laser ablation is preferably used to remove portions of the top layer, the lighter density polymer, which then exposes the heavier density polymer beneath, thereby exposing the desired color in the desired pattern. If more than two polymers are used, the laser ablation technique can be used to expose more than one layer. For example, if three polymers are used, it is possible to ablate two layers of polymers to expose a third, or simply to ablate one layer to expose the second middle layer.

Figure 1:
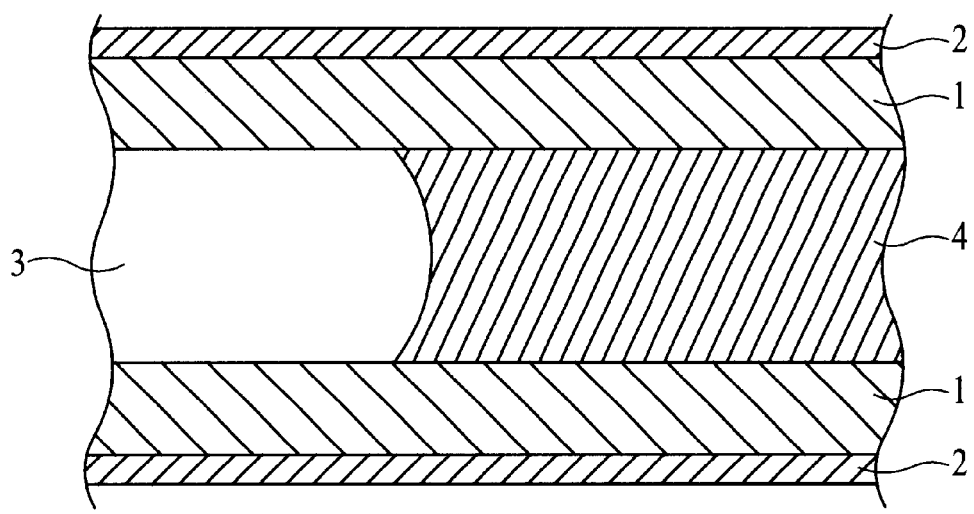
FIG. 1 is a schematic cross section of a mold cavity through which is flowing a polymeric blend according to a preferred embodiment of the present invention.

The preferred embodiments of the present invention are described in greater detail by reference to the accompanying figures. FIG. 1 is a schematic cross section of a mold cavity used to shape a flowable polymeric blend upon injection of the blend. A relatively low density polymer 1, in this preferred embodiment, a black pigmented polymer, segregates from a higher density, polymer 3, in this embodiment, a white pigmented polymer. The lighter density black polymer 1 is displaced from the interior or cavity 4 of the mold towards the inner surface 2 of the mold and away from the higher density polymer 3.

Figure 2:
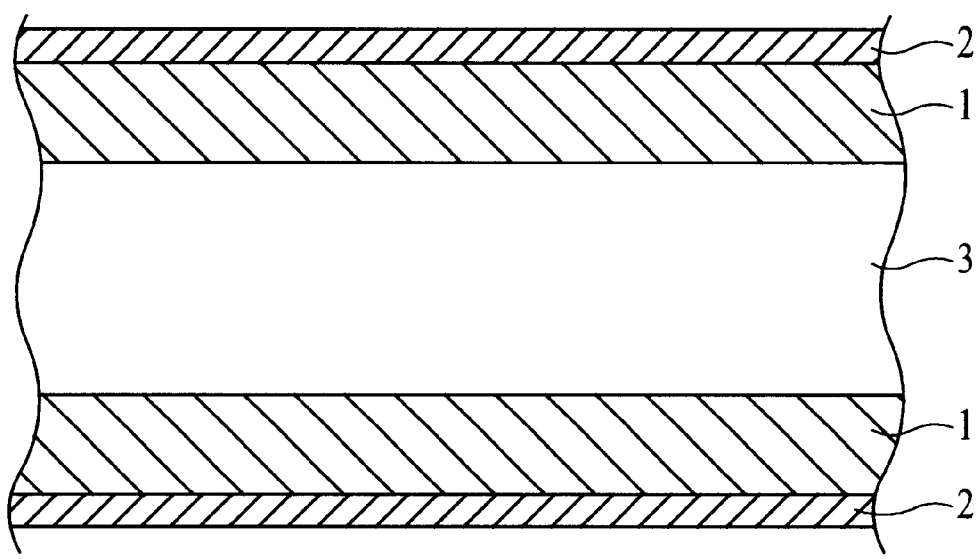
FIG. 2 is a schematic cross section of the mold cavity depicted in FIG. 1, filled with a polymeric blend that has undergone separation according to an aspect of the present invention.

FIG. 2 illustrates the schematic cross section of the mold and polymeric blend after injection and curing, but before removal from the mold. The two polymers have segregated into distinct layers. One of the layers comprises the lighter density black colored polymer 1 which has essentially cured to become a skin layer that surrounds the higher density white colored polymer 3. The higher density white colored polymer 3 has also cured and constitutes a centrally located or inner portion of the molded plastic component within the mold 2.

More particularly, the present invention is preferably practiced as follows. A first polymer is selected with a relatively high specific gravity or density. A dye or pigment is added to the first polymer to yield a desired color. A second polymer is selected with a relatively low specific gravity or density, as compared to the first polymer. A dye or pigment is added to the second polymer to yield a desired color, different than the dye or pigment added to the first polymer. Other additives may be added depending upon the desired properties of the molded product. Additional polymers may be included, to which have been added dyes or pigments with different colors, depending on the desired image and its color configuration. The polymers are then mixed, heated if necessary, in order to form a single liquid polymer blend or mixture. The blend is preferably heated to a temperature greater than the melting temperature of each of the polymeric systems constituting the blend. The polymer blend is then added to an injection molding machine, which injects the polymer blend into the cavity of a mold, which is set in the desired shape of the finished product.

After and/or during injecting, the polymeric systems typically immediately separate, or essentially so, with the lower density polymers being disposed proximate to the inner surface of the walls of the mold, and the heavier density polymers being disposed beneath the lighter density polymeric systems, or generally within the interior of the mold. The lower density polymeric systems thereby form a coating or outer layer around the heavier density polymeric systems. The temperature of the mold wall is preferably, at a different temperature than the polymeric blend, and at a temperature that is lower than the glass transition temperature ($T_g$) of the polymers in the polymeric blend, and most preferably also below the melting point of each of the polymeric systems within the blend.

Once the polymeric blend enters the mold cavity and the polymeric systems separate, the lightest density polymer, when in contact with the mold wall surface, which as noted is preferably at a lower temperature, freezes and solidifies to form a skin layer. The entire polymeric blend eventually solidifies and is cured, wherein the polymeric systems harden and form the desired plastic component. The thicknesses of the various segregated systems may vary, and depend in large part upon the configuration of the mold cavity and relative proportions of the polymeric systems constituting the mixture or blend. However, in many instances, the outer layer will have a thickness in the range of from about 1.0 to about 10.0 mm, and the second or additional layers or interior regions will have similar or greater thickness dimensions.

Following curing, a method of laser ablation is preferably used in order to remove portions of the top layer, the lightest density polymer, thereby exposing the heavier density polymeric system that is dyed or that contains colored pigments, to produce the desired colored pattern. If more than two polymer systems are used, the laser ablation technique can be used to expose more than one layer. For example, if three polymers are used, it is possible to ablate two layers of polymers to expose the third, or simply to ablate one layer to expose the second middle layer.

Another feature of the present invention is the simultaneous molding of two or more liquid/flowable polymeric systems, each having a specific and different color or pigment added to the polymer, to form a multilayered polymeric substrate. An important advantage of this aspect is that it allows multiple layers of differently colored polymeric systems to be formed without having to apply and cure each layer separately and avoids the requirement of having to utilize costly multi-material molding equipment. In one preferred embodiment according to the present invention, two polymeric systems are used. In yet another preferred embodiment, three polymeric systems are used. It is contemplated that the present invention may utilize four or more polymeric systems to form multi-layered substrates in a single molding operation.

Polymers suitable for the preferred embodiments described herein exhibit a range of useful and desirable properties, namely mechanical strength, impact resistance, high finish gloss, stain resistance, low cost, and favorable injection molding properties. These polymers are preferably thermoplastics, such as, but not limited to, acrylonitrile-butadiene-styrene terpolymer, acrylonitrile-butadiene-styrene polymerized with methyl methacrylate, styrene-butadiene copolymer, and blends of acrylonitrile-butadiene-styrene terpolymer with polycarbonate. A wide array of other polymers could also be used, such as poly(styrene-co-acrylonitrile), polystyrene homopolymer, poly(styrene-co-butadiene) and polyamides. In many instances, blends of these polymers may be used. All of the noted polymers could be used as either the low density polymeric system or as the high density polymeric system depending upon the densities of the other system(s) with which the polymers are combined.

Inorganic as well as organic pigments and dyes can be used in the preferred embodiments of the present invention as coloring agent(s) for each of the polymeric systems that are mixed to form the polymeric blend or mixture. Thus, nearly any dyes or pigments can be used provided that the dye or pigment does not interfere with or alter the physical and mechanical properties of the polymeric system, which in turn, might affect performance of the resulting plastic component.

In a particularly preferred embodiment of the invention in which a white polymeric system and a black polymeric system are used, the coloring agent used for the white polymeric system comprises 2.55–2.95 parts (by weight) of titanium dioxide per hundred parts of the polymer, 0.2–0.3 pph of aluminum hydroxide, 0.23–0.29 pph of amorphous silicon dioxide, and 0.04–0.05 pph of mineral oil. The coloring agent that is used for the black polymeric system comprises 0.24–0.27 pph of anthraquinone, 0.31–0.36 pph of carbon black, and 0.076–0.110 pph of mineral oil. These preferred coloring agents are summarized below in Tables 1 and 2.

TABLE 1

Composition of White Coloring Agent

| Component | Composition (pph of Polymer) |
|---|---|
| Polymer | 100–100 |
| Titanium Dioxide | 2.55–2.95 |
| Aluminum Hydroxide | 0.2–0.3 |
| Amorphous Silicon Dioxide | 0.23–0.29 |
| Mineral Oil | 0.04–0.05 |

TABLE 2

Composition of Black Coloring Agent

| Component | Composition (pph of Polymer) |
|---|---|
| Polymer | 100–100 |
| Anthraquinone | 0.24–0.27 |
| Carbon Black | 0.31–0.36 |
| Mineral Oil | 0.076–0.110 |

In another preferred embodiment of the present invention, the polymeric blend comprises three polymeric systems. The first polymeric system comprises an acrylonitrile-butadiene-styrene (ABS) terpolymer and acrylonitrile-butadiene-styrene copolymerized with methyl methacrylate (ABS-co-MMA). The second polymeric system comprises a blend of acrylonitrile-butadiene-styrene terpolymer blended with polycarbonate (ABS/PC) and ABS-co-MMA copolymer. The third polymeric system comprises poly(styrene-co-butadiene) (PBD) and ABS. The specific gravities or densities of each of these systems may be tailored depending upon the density of each polymer used, and the relative amount of each polymer.

Another important characteristic of the preferred embodiment polymer blends of the present invention is the difference between the densities of the different polymeric systems. This is important when injecting the polymeric mixture into the mold cavity, since the polymeric system having a relatively low specific gravity will generally segregate from the core or flowing mass of the polymeric blend and separate from the more dense polymeric system according to the difference in the density. Therefore, the differences in the specific gravities or densities must be significant enough to promote separation of the polymeric systems. The density and weight of each of the specific polymers used is also dependent upon the dye or color pigment that is added to each of the polymers. And so, care should be taken that the preferred differences in densities described herein exist after all coloring agents and any other additives have been added.

In the preferred embodiments of the present invention, the densities of the various polymers are as follows. The acrylonitrile-butadiene-styrene terpolymer has a typical density of 1.07 grams/cc, with a range between 1.03 and 1.10. Acrylonitrile-butadiene-styrene terpolymer copolymerized with poly(methyl methacrylate) copolymer has a typical density of 0.99 grams/cc, with a range of density between 0.97 and 1.10. The acrylonitrile-butadiene-styrene terpolymer blended with polycarbonate has a typical density of 1.16 grams/cc, with a range between 1.13 and 1.20. Poly(styrene-co-butadiene) has a typical density of 1.02 grams/cc, with a range between 1.01 and 1.03. Specific gravity is preferably determined in accordance with ASTM D792 standard. Density is preferably expressed by multiplying the specific gravity by 0.9975.

The relative proportions of each of the components in the first, second, and third or additional polymeric systems are adjusted according to the desired specific gravity or density of the resulting polymeric system. Preferably, the density of the first polymeric system ranges from about 0.95 to about 1.10 grams/cc. The density of the second polymeric system preferably ranges from about 1.05 to about 1.20. And, the density of the third polymeric system preferably ranges from about 1.00 to about 1.15. The present invention includes the use of polymeric systems exhibiting different densities or combinations of densities.

As previously noted, the consideration of densities of each of the polymeric systems, and their densities relative to each other, are important in the present invention in order to allow the polymeric blend or mixture containing the various polymeric systems to separate quickly and preferably, completely. In order to ensure effectiveness of the invention, the density of each of the polymeric systems is further exploited by the relatively high pressure used to inject the mixture into the mold cavity. That is, when injecting into the mold cavity at a high pressure, the differences in densities of the polymeric systems are significant in that they promote separation of the mixture. In a preferred embodiment of the present invention, a very high injection pressure is used in the injection system, such as at least 8000 psi, and preferably between about 11,000 and about 20,000 psi. It will be understood that depending upon the configuration of the molding equipment, greater or lesser injection pressures may be used. Injection pressure, as that term is used herein, is typically measured at the injection molding machine.

In order to promote separation of the respective polymeric systems, it is preferred that the densities of the respective systems (including after incorporation of the desired coloring agents and any other additives) differ by at least 0.02 grams/cc, more preferably by 0.04 grams/cc, and most preferably by at least 0.06 grams/cc. In many applications, it may be particularly desirable to utilize a blend or mixture of polymeric systems that differ in density by at least 0.10 or more grams/cc.

Another key feature of the preferred embodiments of the present invention is the difference in temperature between the polymer blend, the injection molding apparatus, and the mold itself. A conventional molding apparatus designed to direct molten polymeric material into a mold cavity from a heated injection barrel gate may be used. The barrel is preferably equipped with heating elements and pressure transducers along with a mixing screw or plunger that is heated. The temperature of the walls of the mold is set or otherwise controlled to be lower than that of the barrel of the injection molding apparatus in order to optimize the cooling (solidifying) of the polymeric mixture mass inside the cavity.

To avoid thermal degradation during injection molding, the selected polymer systems should not differ by more than 100 degrees Fahrenheit in their melting temperatures. Further, the difference between the melt flow index of the polymeric systems within the polymeric blend should not be greater than 30 grams/10 minutes at 230 degrees Celsius under a 3 kilogram load since the flow behavior at the melt temperature is important in filling the cavity of the mold. Melt flow index is preferably determined in accordance with ASTM D1238.

In the preferred embodiment of the present invention, the barrel of the injection molding apparatus is heated to a temperature between about 400 to about 600 degrees Fahrenheit. The polymeric systems that constitute the polymeric blend are heated to a temperature that allows the formation of a flowable mixture which can readily travel through the injection molding apparatus. Once injected, the polymeric mixture passes through the heated barrel of the injection molding apparatus to the mold cavity. The mold is preferably set at a temperature that is less than the glass transition temperature (Tg) of the polymeric mixture, and preferably set lower than the melting point of each of the polymeric systems within the blend or mixture. Often, molding injection times are relatively quick, such as on the order of several seconds or less.

It is not known precisely why the flowable polymeric blend described herein separates into its constituents during injection molding. However, it is believed that the phenomenon results from a combination of factors including, but not limited to, (i) the differences between densities of the polymeric systems employed in the blend, (ii) the temperatures of the blend and mold, (iii) the relatively high pressure utilized when introducing the polymeric blend into the mold, and (iv) the viscosities of the polymeric systems and the resulting blend.

The hardening or curing of the preferred embodiment polymeric mixture of the present invention is also a key feature. Once injected into the mold cavity, the lightest density polymer, having separated or at least begun to separate, almost immediately cools and solidifies to form a frozen skin layer surrounding the more dense polymer(s). Since the mold is preferably at a temperature that is lower than the glass transition temperature (Tg) of each of the polymeric systems, the lightest density polymeric mixture, after having separated, will form the skin layer almost immediately after being injected into the mold cavity. The time to cure, or solidify, improves greatly, i.e. decreases, as the temperature of the mold is reduced. As noted, in the preferred embodiment of the present invention, the mold should be at a temperature that is lower than the melting points of any of the polymeric systems within the blend or mixture. The lower the temperature of the walls of the mold, the more quickly the frozen skin layer and any other intermediate layers form, thereby reducing the time for curing for the plastic component. If desired, one or more post molding curing operations may be performed, according to conventional techniques known to those skilled in the art.

Figure 3:
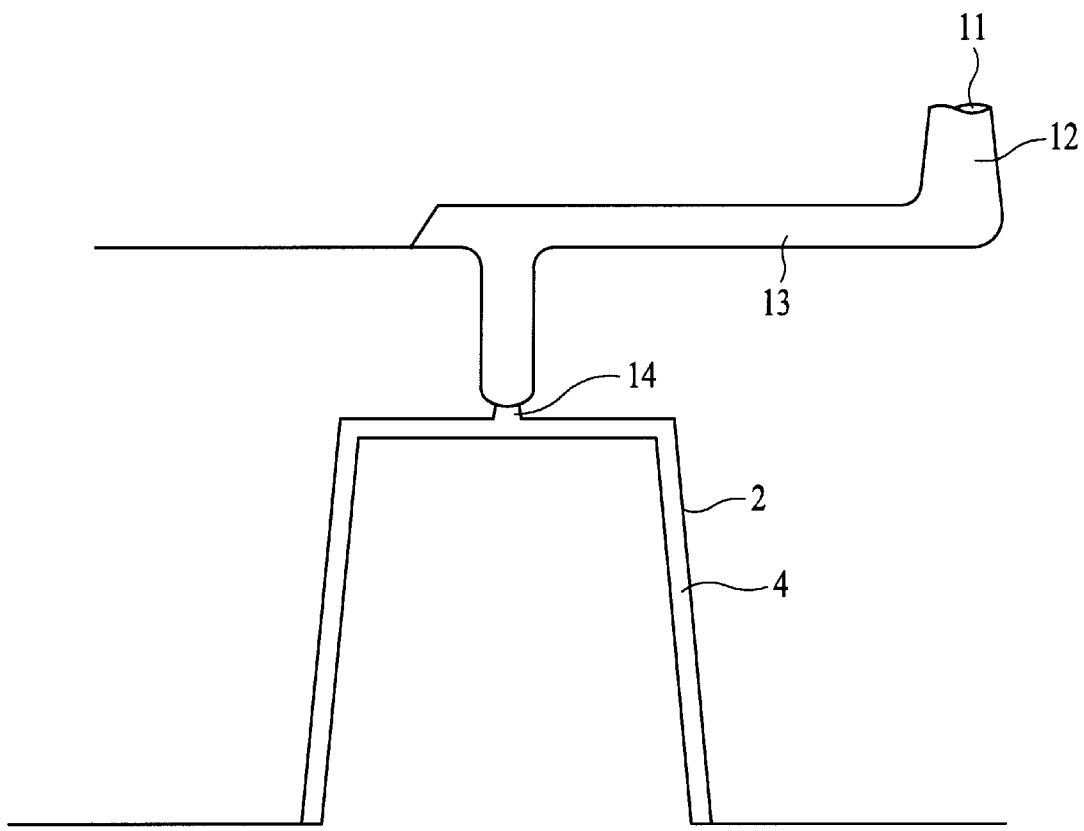
FIG. 3 is a process schematic illustrating an injection molding apparatus utilized in a preferred embodiment method according to the present invention.

FIG. 3 is a schematic view of a preferred apparatus used for injection molding of the polymer blend within the mold cavity 4. The polymer blend is introduced from a feeding system or nozzle 11, to a main sprue 12, and to runner 13. The polymer blend then travels via a gate 14 of the apparatus and into the mold cavity 4, where separation and curing take place to form the plastic component in accordance with the present invention.

It will be understood that the present invention is not limited to the use of injection molding techniques for introducing the polymer blend into a mold cavity. Instead, it is envisioned that other processes such as compression molding could be employed so long as the process is able to administer flowable polymeric blends described herein into a shaped mold in such a fashion that at least two of the polymeric systems forming the blend separate from each other.

Another aspect of the present invention is the process of removing the top layers of the cured polymeric mixture to expose one or more different polymeric system layers beneath the skin layer. The present invention includes numerous techniques for such removal. Methods of exposing the layers formed include sanding, which is disclosed in U.S. Pat. No. 5,904,886, herein incorporated by reference; forced erosion; melting; evaporation; or vaporization (all disclosed in U.S. Pat. No. 5,736,233, herein incorporated by reference). The preferred technique is a laser etching or ablating process. Laser ablation is facilitated by the fact that the outer layers of the cured plastic component are typically skin layers, and therefore relatively thin. Using a laser of sufficient strength will allow the ablation of the outer coating of the plastic component to expose the dyed or color pigmented layers beneath. In this preferred embodiment of the invention, there are only two desired colors for the image; a black low-density polymer that forms the skin layer coating that surrounds a heavier density white-dyed polymeric system.

In general, excimer lasers are capable of removing material by ablation, rather than by thermal-based methods such as vaporization, evaporation, or melting of the impinged media as when YAG or $CO_2$ lasers are employed. In many cases, ablative processing using excimer lasers attains a higher degree of precision than may be attained with YAG or $CO_2$ laser processing or, for that matter, other types of processing in general. Generally, the specific type of laser employed will typically be a function of the specific material being processed. The laser used in this preferred embodiment of the present invention ablates the black skin layer coating and thus exposes the white layer in a pattern of the desired image. An example of such a laser source is a solid-state Neodymium:yttrium aluminum Garnet (Nd:YAG) laser, which is operated at about 1064 nanometers and/or 532 nanometers wavelength range. Another example of a laser source is a solid-state Neodymium:yttrium Vanadide (Nd:$YVO_4$) laser, which is operated at about 1064 nanometers and/or 532 nanometers wavelength range. Preferably, a lens of 254 millimeters having an aperture of 1.4 millimeters is employed.

Figure 4:
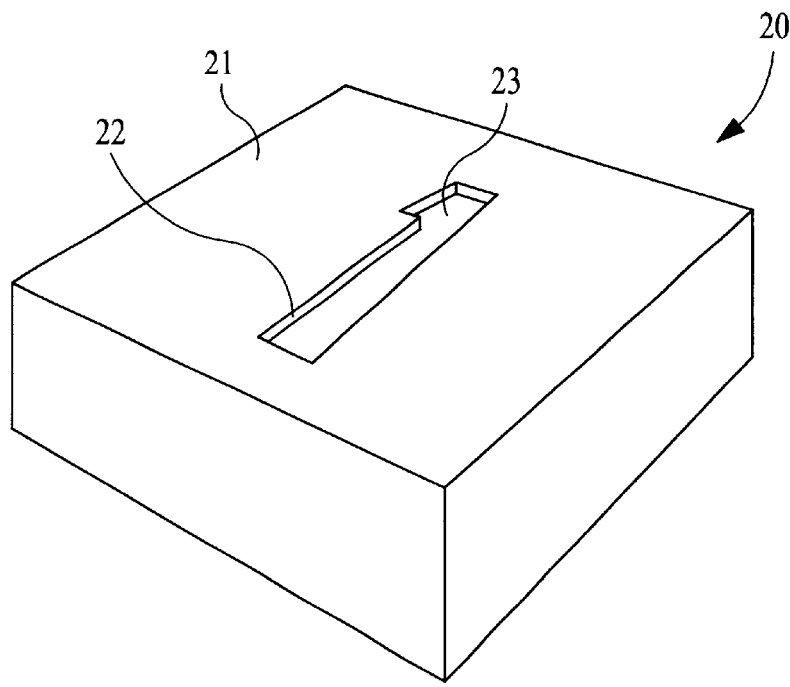
FIG. 4 is a perspective view of a preferred embodiment molded component formed in accordance with the preferred embodiment techniques of the present invention.

FIG. 4 is a perspective view of a preferred embodiment molded component 20 produced in accordance with the preferred techniques of the present invention. FIG. 4 illustrates a marking or indicia formed along an outer surface 21 of the component 20. The marking results from removing, such as by laser ablation, a portion of the outer layer or periphery of the component 20 and thereby defining a pattern boundary 22. Removal of the portion of the outer layer of component 20 reveals an underlying layer 23, preferably of a different color than the color of the outer surface 21. The depth of the boundary 22 corresponds to the thickness of the outer layer of component 20, at least in that region of the molded component 20.

Figure 5:
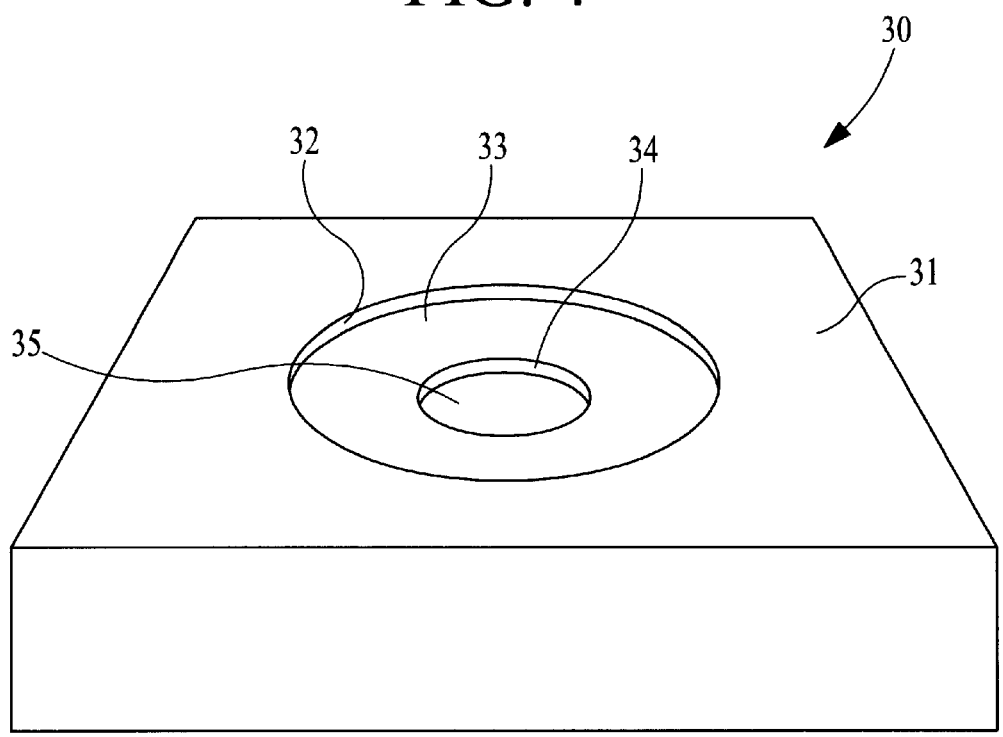
FIG. 5 is a perspective view of another preferred embodiment molded component formed in accordance with the preferred embodiment techniques of the present invention.

FIG. 5 is a perspective view of another preferred embodiment molded component 30 produced in accordance with the present invention. FIG. 5 illustrates a marking in the shape of a circle formed along an outer surface 31 of the component 30. The marking results from removing, preferably by laser ablation, a portion of the outer layer or periphery of the component 30 and thereby defining a pattern boundary 32. Removal of the portion of the outer layer of component 30 reveals an underlying layer 33, preferably of a different color than the color of the outer surface 31. The depth of the boundary 32 corresponds to the thickness of the outer layer of component 30. Removal of the portion of the underlying layer 33 along a boundary 34 reveals yet another underlying layer 35 disposed below or underneath the layer 33. The depth of the boundary 34 corresponds to the thickness of the underlying layer 33. Preferably, the color of the underlying layer 35 is different than the color of the layer 33.

Of course, it should be understood that a range of changes and modifications can be made to the preferred embodiments described above. It is therefore intended that the foregoing detailed description be regarded as illustrative rather than limiting and that it be understood that it is the following claims, including all equivalents, which are intended to define the scope of the invention.

We claim:

1. A process for producing a polymeric component having an outer region of a first color and a design or indicia of a second color defined within said region, said process comprising:

blending a first polymeric system selected to provide said second color, and a second polymeric system selected to provide said first color to form a polymeric blend, said first polymeric system having a density that is greater than the density of said second polymeric system by at least 0.04 grams/cc;

heating said polymeric blend to a liquid flowable state;

introducing said flowable polymeric blend to a mold having walls defining a mold cavity while under an injection pressure of at least 8000 psi sufficient to cause said first polymeric system to collect proximate said mold walls and thereby at least partially separate from said second polymeric system;

solidifying said separated polymeric blend in said mold cavity to form said polymeric component; and removing portions of an outer layer of said second polymeric system disposed along the outer periphery of said polymeric component to expose said first polymeric system generally disposed within the interior of said polymeric component, and thereby produce said design on said polymeric component.

2. The process of claim 1 wherein said first polymeric system has a density greater than said second polymeric system by at least 0.06 grams/cc.

3. The process of claim 2 wherein said first polymeric system has a density greater than said second polymeric system by at least 0.10 grams/cc.

4. The process of claim 1 wherein said flowable polymeric blend is introduced into said mold cavity at an injection pressure in the range of from about 8,000 psi to about 20,000 psi.

5. A process for producing a polymeric component having an outer region of a first color and a design or indicia of a second color defined within said region, said process comprising:

providing a first polymeric system having said second color;

providing a second polymeric system having said first color, wherein the density of said second polymeric system is greater than the density of said first polymeric system by at least 0.02 grams/cc;

combining said first polymeric system with said second polymeric system to produce a polymeric blend;

placing said polymeric blend in a flowable state;

providing a mold having one or more mold walls that define a mold cavity;

introducing said flowable polymeric blend into said mold cavity under conditions sufficient to cause said first polymeric system to collect proximate said mold walls and thereby at least partially separate from said second polymeric system and form a layered array;

solidifying said layered array;

removing said layered array from said mold cavity; and removing a portion of said first polymeric system that constitutes an outer layer of said layered array, to reveal said second polymeric system disposed beneath said layered array.

6. The process of claim 5 wherein said first polymeric system is selected from the group consisting of (i) acrylonitrile-butadiene-styrene terpolymer, (ii) acrylonitrile-butadiene-styrene polymerized with methyl methacrylate, (iii) styrene-butadiene copolymer, (iv) blends of acrylonitrile-butadiene-styrene terpolymer with polycarbonate, (v) poly(styrene-co-acrylonitrile), (vi) polystyrene homopolymer, (vii) poly(styrene-co-butadiene), (viii) polyamides, and (ix) combinations of the foregoing.

7. The process of claim 5 wherein said second polymeric system is selected from the group consisting of (i) acrylonitrile-butadiene-styrene terpolymer, (ii) acrylonitrile-butadiene-styrene polymerized with methyl methacrylate, (iii) styrene-butadiene copolymer, (iv) blends of acrylonitrile-butadiene-styrene terpolymer with polycarbonate, (v) poly(styrene-co-acrylonitrile), (vi) polystyrene homopolymer, (vii) poly(styrene-co-butadiene), (viii) polyamides, and (ix) combinations of the foregoing.

8. The process of claim 5 wherein the density of said second polymeric system is greater than the density of said first polymeric system by at least 0.04 grams/cc.

9. The process of claim 8 wherein the density of said second polymeric system is greater than the density of said first polymeric system by at least 0.06 grams/cc.

10. The process of claim 9 wherein the density of said second polymeric system is greater than the density of said first polymeric system by at least 0.10 grams/cc.

11. The process of claim 5 wherein one of said first polymeric system and said second polymeric system includes a white coloring agent comprising:

from about 2.55 to about 2.95 parts titanium dioxide;

from about 0.2 to about 0.3 parts aluminum hydroxide;

from about 0.23 to about 0.29 parts silicon dioxide; and from about 0.04 to about 0.05 parts mineral oil, per one hundred parts of polymer.

12. The process of claim 5 wherein one of said first polymeric system and said second polymeric system includes a black coloring agent comprising:

from about 0.24 to about 0.27 parts anthraquinone;

from about 0.31 to about 0.36 parts carbon black; and from about 0.076 to about 0.110 parts mineral oil, per one hundred parts of polymer.

13. The process of claim 5 wherein said step of placing said polymeric blend in a flowable state is performed by heating said blend to a temperature greater than the melting temperatures of said first polymeric system and said second polymeric system.

14. The process of claim 5 wherein said step of introducing said polymeric blend into said mold cavity is performed at an injection pressure of at least 8000 psi.

15. The process of claim 14 wherein said polymeric blend is introduced into said mold cavity at an injection pressure in the range of from about 8,000 psi to about 20,000 psi.

16. The process of claim 5 wherein said step of introducing said polymeric blend into said mold cavity is performed while said mold walls are at a temperature less than the glass transition temperature (Tg) of each of said first polymeric system and said second polymeric system.

17. The process of claim 16 wherein said step of introducing said polymeric blend into said mold cavity is performed while said mold walls are at a temperature less than the melting temperature of each of said first polymeric system and said second polymeric system.

18. The process of claim 5 wherein said step of removing a portion of said first polymeric system is performed by laser ablation in which a laser ablates said first polymeric system away from said layered array.

19. The process of claim 18 wherein said laser is selected from the group consisting of a Neodymium:yttrium aluminum Garnet laser and a Neodymium:yttrium Vanadide laser.

20. The process of claim 19 wherein said laser is operated at about 1064 nanometers range.

21. The process of claim 19 wherein said laser is operated at about 532 nanometers range.

22. An injection molding process for producing a molded polymeric component having a first outer layer of a first polymeric system surrounding a second polymeric system generally disposed within said interior of said polymeric component, said process comprising:

forming a polymeric mixture that includes (i) a first polymeric system and (ii) a second polymeric system, in which the density of said second polymeric system is greater than the density of said first polymeric system by at least 0.04 grams/cc; and molding said polymeric mixture at an injection pressure of at least 8,000 psi, whereby said molded polymeric component having a first outer layer of said first polymeric system surrounding said second polymeric system generally disposed within said interior of said component is produced.

* * * * *